(12) United States Patent
Tucceri

(10) Patent No.: US 8,479,842 B2
(45) Date of Patent: Jul. 9, 2013

(54) GARDEN AUGER

(76) Inventor: Joseph Tucceri, Mentor, OH (US)

(*) Notice: Subject to any disclaimer, the term of this patent is extended or adjusted under 35 U.S.C. 154(b) by 148 days.

(21) Appl. No.: 13/008,512

(22) Filed: Jan. 18, 2011

(65) Prior Publication Data

US 2012/0181088 A1  Jul. 19, 2012

(51) Int. Cl.
*E21B 10/44* (2006.01)

(52) U.S. Cl.
USPC ............................. 175/20; 175/58; 175/403

(58) Field of Classification Search
USPC ........ 175/20, 59, 403; 111/113, 116; 172/111
See application file for complete search history.

(56) References Cited

U.S. PATENT DOCUMENTS

| 2,831,659 A * | 4/1958 | Kukuchek et al. ............. 175/323 |
| 3,273,401 A * | 9/1966 | Kaufmann et al. ........ 73/864.33 |
| 4,351,401 A | 9/1982 | Fielder |
| 4,779,689 A * | 10/1988 | Paxton, III .................... 175/403 |
| 4,901,800 A | 2/1990 | Wilson |
| 5,063,863 A | 11/1991 | Peterson |
| 5,564,353 A | 10/1996 | Wade et al. |
| 6,102,135 A * | 8/2000 | Shaw .............................. 175/20 |
| 6,125,776 A | 10/2000 | Carmichael |
| 6,227,317 B1 | 5/2001 | Severns |
| 6,296,068 B1 | 10/2001 | Frederick |
| 6,675,918 B2 | 1/2004 | Chou |
| 6,955,227 B1 | 10/2005 | Motosko |
| 7,131,506 B2 * | 11/2006 | Hamilton et al. ............. 175/403 |
| 2010/0243332 A1 * | 9/2010 | Paxton, III .................... 175/403 |

* cited by examiner

*Primary Examiner* — William P Neuder
(74) *Attorney, Agent, or Firm* — Fay Sharpe LLP

(57) ABSTRACT

The present disclosure provides for a garden auger comprising a shank and an auger body. The auger body comprises a leading end and a trailing end including a space therebetween. The auger body is substantially radial including at least two legs connecting the trailing end and the leading end. The leading end has a cutter including a plurality of teeth forming a cutting diameter. The plurality of teeth each have a tip extending from the leading end, wherein the tips form a plane that is substantially perpendicular to an axis of rotation of the garden auger. The auger body is attached to the shank to prevent rotation therebetween. The shank comprises an attachment portion for attachment to a drill motor.

18 Claims, 4 Drawing Sheets

GARDEN AUGER

BACKGROUND

The field of the disclosure pertains to augers for use in planting and methods for using same. Augers for boring holes in the ground have existed for quite some time. Traditionally they are constructed in accordance with a standard helical screw type configuration having a central shaft and an inclined plane wrapped around the central shaft in a spiral staircase fashion. While these "spiral staircase" types of augers have proven successful for boring holes for telephone poles, post holes and foundation piers, they are not satisfactory for boring holes for bulbs, seedlings and perennial starts.

Typically the drive motors for the "spiral staircase" types of augers are gas powered with slow rotation and high torque and connected with clutches to the auger. For large telephone pole type augers the drive motors are rendered stationary and for the two-person augers used for post holes, the two operators provide the stability. Because of the strong driving force and stability, the rotation of the auger can successfully elevate the new dirt that is captured by the auger blades up and out of the hole. However, because of the helical screw type blade, the tendency of these types of augers is to merely screw themselves into the ground, just as a screw is driven into wood or metal without creating a hole. The holes are actually created by preventing the auger from being pulled into the ground by restraining the vertical speed at which the auger penetrates the ground. To accomplish this, the user must have sufficient countering force to prevent penetrating the ground at the same rate as the rotation and pitch of the screw would normally require. For large telephone pole augers, this is no problem since they are mounted to large stationary drives which also restrict the penetration rate. When using a one or two person post hole digger, the users must provide the countervailing force, which as anyone who has used those devices knows, is the majority of the work that is required.

With known spiral staircase augers for use with electric drills for planting bulbs, the user will usually have to slow the speed of the auger down dramatically, which can result in difficulty in penetrating hard soil, or exert a great deal of energy preventing the auger from screwing itself into the ground. Thus, the known spiral staircase augers are not optimal for long periods of use and are not efficient either in speed or energy usage.

Further, since the earth is elevated along the helical blade, effort is required to lift the fully loaded spiral staircase auger out of the hole or the auger and drive motor must be held stationary for a period of time to allow the helical blade to clear itself of loosened earth. In sandy soil, typically the auger will not successfully clear the hole because the sandy soil will slide back down the helical blade and refill the hole. Finally, the traditional spiral staircase auger has a limitation on the size of the rocks that can be elevated, namely the vertical distance between the turns of the helix.

When planting bulbs, seedlings, perennial starts and other new plants in fields and yards, it is not practical or desirable to carry along a heavy powerful gasoline powered drive motor. If the area in which the plants are to be planted is not close to a continuous electrical power source, the only practical power source is battery powered devices which typically have lower power and torque than conventional gasoline powered drives or wired electrical devices.

In planting most forms of vegetation such as trees, bushes, flowers, ground cover, bulbs, seeds and the like, the best results are obtained by surrounding the plant roots or the seed with loosely packed soil to promote root growth. If the surrounding soil is too hard packed, the plant can become root bound. However, the soil is often hard packed at locations where planting is desirable. One solution to this problem has been to form an oversized hole, pulverize the hard packed soil removed to make the hole and loosely pack the pulverized soil above the bulb or the seed during the planting process. It is beneficial for there to be a thick layer of pulverized soil underneath the plant, when a deep root system is desired.

Before the development of powered garden tools and landscaping equipment, such vegetation was planted by hand, typically using a shovel or the like to dig out a suitably sized hole in the ground to accommodate the plant or seed and the pulverized soil. Pulverizing soil by hand is very laborious and time consuming. With todays powered gardening tools and landscaping equipment, forming an oversized hole and producing sufficiently pulverized soil has become significantly less labor intensive and time consuming. However, even with present power tools and equipment, there is still a need to reduce the manual labor and time associated with the planting process.

Thus, a method and auger for planting bulbs, seedlings, perennial starts and other plants that works well with low power and low torque drive motors in remote areas and that can create holes quickly with little effort by the user is needed and desired.

SUMMARY

The present disclosure comprises a unique auger and method for using same. In one embodiment the auger comprises an auger blade substantially perpendicular to the axis of rotation, wherein the auger cutter or blade extends substantially across the entire diameter of the bored hole. The disclosed embodiments allow the user to easily and completely control the speed at which the auger penetrates the ground while preventing the auger from being pulled into the ground.

One aspect of the present disclosure provides for a garden auger comprising a shank and an auger body. The auger body comprises a leading end and a trailing end including a space therebetween. The auger body is substantially radial including at least two legs connecting the trailing end and the leading end. The leading end has a cutter including a plurality of teeth forming a cutting diameter. The plurality of teeth each have a tip extending from the leading end, wherein the tips form a plane that is substantially perpendicular to an axis of rotation of the garden auger. The auger body is attached to the shank to prevent rotation therebetween. The shank comprises an attachment portion for attachment to a drill motor.

Another aspect of the present disclosure provides a garden auger for forming a planting hole in soil. The garden auger comprises a shank and an auger body. The auger body comprises a leading end, a trailing end, and at least one leg connecting the leading end and the trailing end. The garden auger further includes an axis of rotation centered within the auger body, the leading end, and the trailing end. The leading end includes a rotary cutter having a plurality of teeth for forming the planting hole in soil. The rotary cutter has a cutting diameter and the auger body has an outside diameter, wherein the cutting diameter is larger than the outside diameter. The leading end, the trailing end, and the at least one leg form a housing for holding a plug of soil upon extraction of the garden auger from a formed planting hole.

Yet still a further aspect of the present disclosure provides for a method for forming a planting hole in soil using a portable drill having a chuck for receiving tools to be rotatably driven. The method comprises: engaging soil with a leading end of an auger body wherein the leading end has a circular perimeter including a plurality of cutting teeth therearound, the cutting teeth being equi-spaced around a perimeter of the leading end; rotating a trailing end of the auger body, via rotation of a shank adapted for insertion into the chuck of the drill, in a direction to advance the cutting teeth into the soil to form a plug of the soil for extraction of the plug from the planting hole; and, removing the auger body from the planting hole while maintaining rotation of the auger body, thereby extracting the plug including a substantial portion of the soil within the planting hole. The substantial portion of the soil includes at least a majority of the soil within the planting hole.

An additional objective of the present disclosure is to provide such a planting hole forming apparatus that is versatile yet inexpensive to manufacture.

Another objective of the present disclosure is to provide such a planting hole forming apparatus that facilitates planting by reducing the time and labor required for planting.

Yet another objective of the present disclosure is to provide such a planting hole forming apparatus capable of forming suitable holes for planting a wide variety of plant-life, including seeds and bulbs.

It is therefore an object of the present disclosures to provide a garden auger that generates at most a slight downward pull when operated at high speeds and quickly clears the hole for planting.

DETAILED DESCRIPTION

Figure 1:
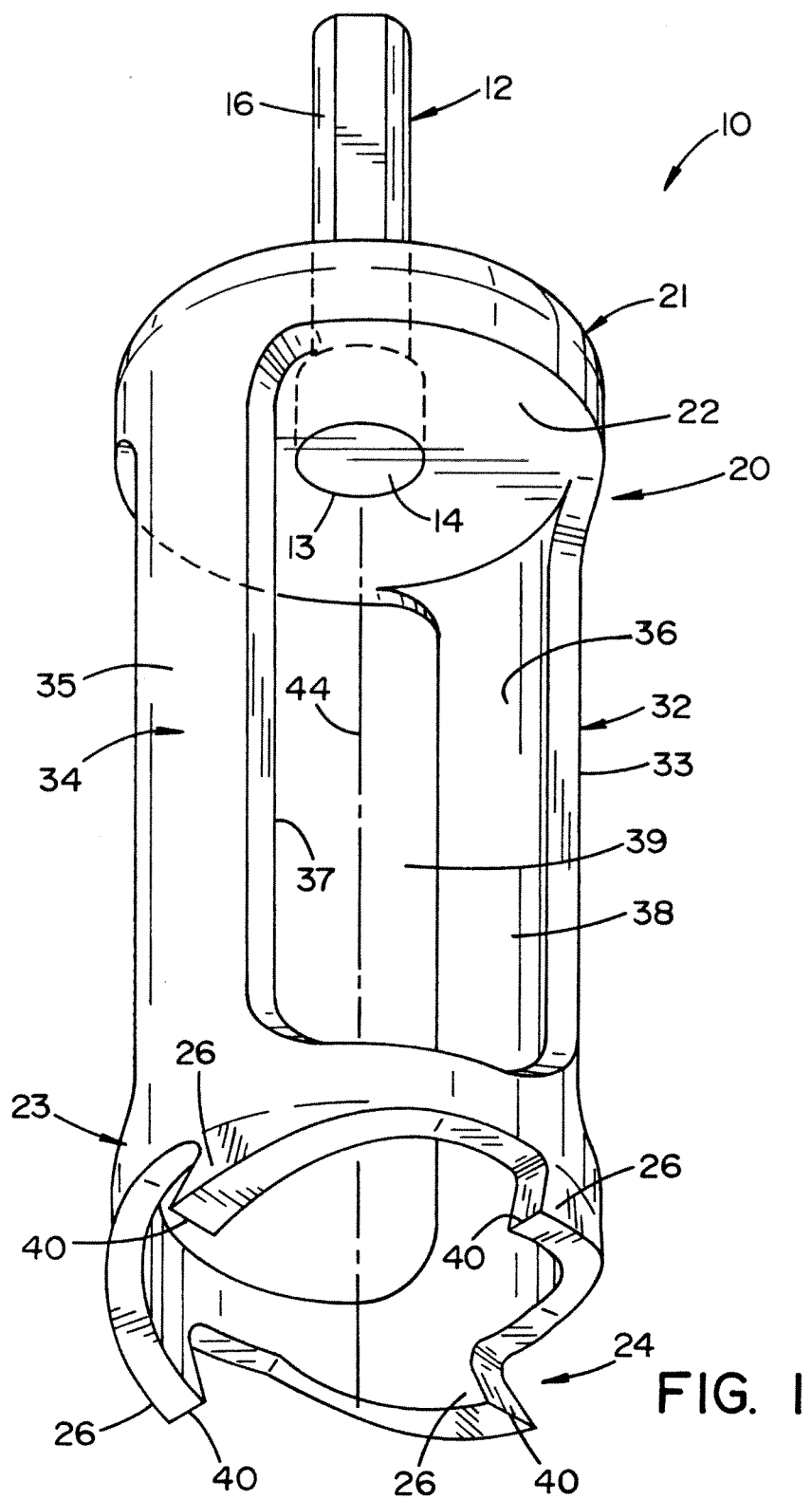
FIG. 1 is a perspective view of a garden auger in accordance with the present disclosure.

The garden auger 10 in FIG. 1 comprises a shank or shaft 12 and an auger body 20. The shaft 12 can be ⅜" in diameter. One method for use of the garden auger 10 of FIG. 1 is with a ⅜" drill motor. As such the shaft 12 includes an attachment portion 16 having a diameter of ⅜". It is to be understood that if the drill motor to be used in conjunction with the garden auger was ½", the attachment portion 16 would be ½" in diameter. Similarly, if the drill motor to be used was a /1;4" diameter drill motor the attachment portion 16 would be ¼" in diameter. In one aspect of the disclosure, the attachment portion 16 can be hexagonal in cross section to prevent slippage between the drill motor (not shown) and attachment portion 16 when the ground is exceptionally rocky or binding. The hexagonal cross section can include the attachment portion 16 having alternating flat sides and curved sides (i.e. the flat sides are 120 degrees apart from one another).

In the garden auger of FIG. 1 the shaft 12 can be approximately 2" long, leaving approximately 1.5" extending from the auger body 20 which represents the attachment portion 16. The attachment portion 16 extends from a trailing end 21 of auger body 20 after a threaded mounting end of radial shaft 12 is mounted to auger body 20. Some of the attachment portion 16 is inserted into a chuck of the drill motor in which it will be inserted.

The garden auger 10, as shown in FIGS. 1-6, also comprises the auger body 20. The auger body 20 may be formed integrally with auger shaft 12. However, for ease in manufacturing the auger body 20 can be attached to the shaft 12 by threading a male end 13 of shaft 12 into a female opening in the top side or trailing end 21 of auger body 20. A terminal end 14 of shaft 12 can be substantially flush with an inside face 22 of top side 21. The inside face 22 and terminal end 14 can form a planar configuration that represents a limit stop arrangement for setting a maximum hole depth when the auger 10 is in use. To be described in more detail hereinafter, the planar configuration of inside face 22 and terminal end 14 facilitates dirt evacuation from auger body 20 after the planting hole is formed. The treaded male end 13 can be affixed with thread locking adhesive or spot welded to secure the threaded end 13 to the opening in the top side 21.

Figure 2:
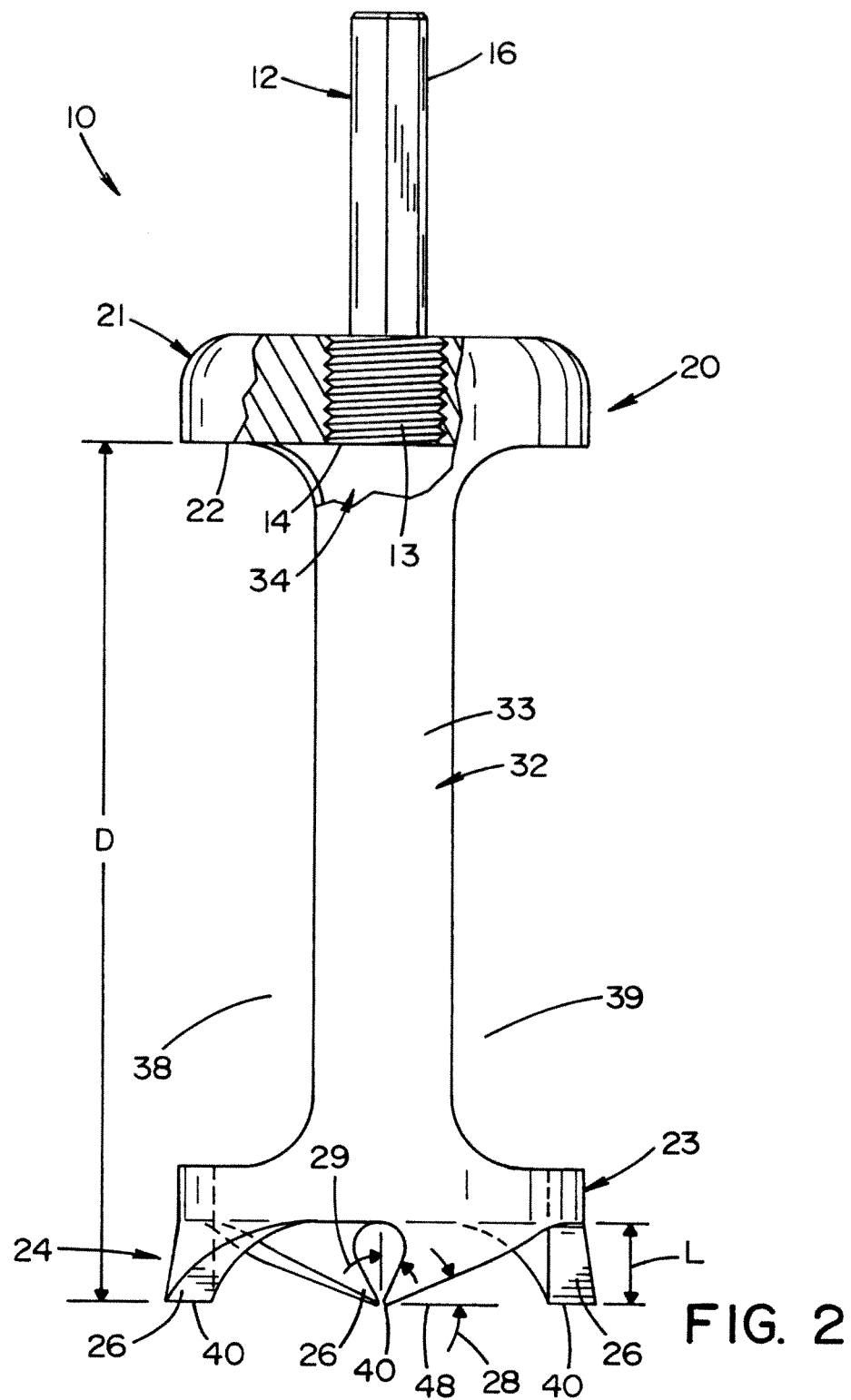
FIG. 2 is a front view of the garden auger in accordance with the present disclosure.
Figure 3:
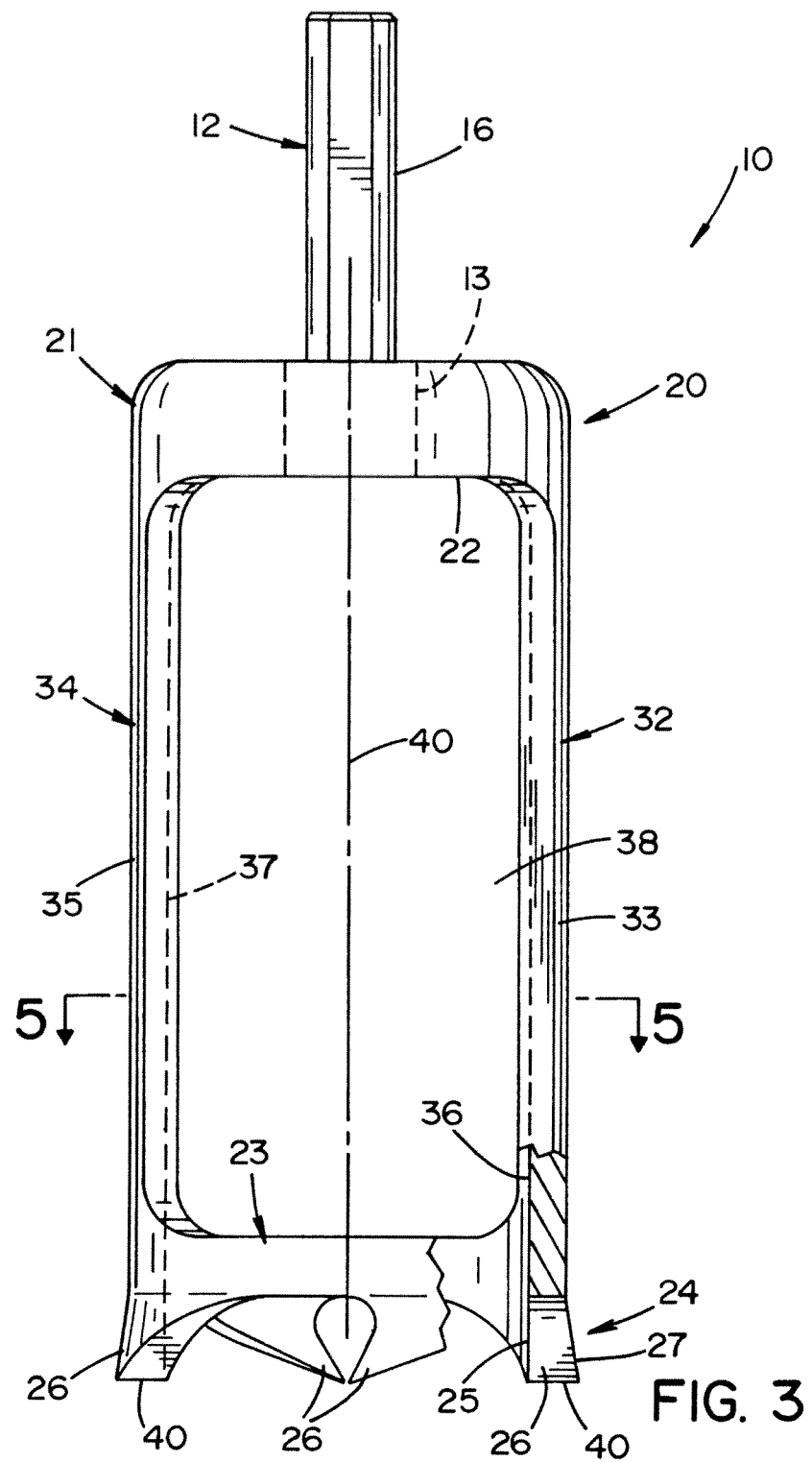
FIG. 3 is a side view of the garden auger in accordance with the present disclosure.
Figure 4:
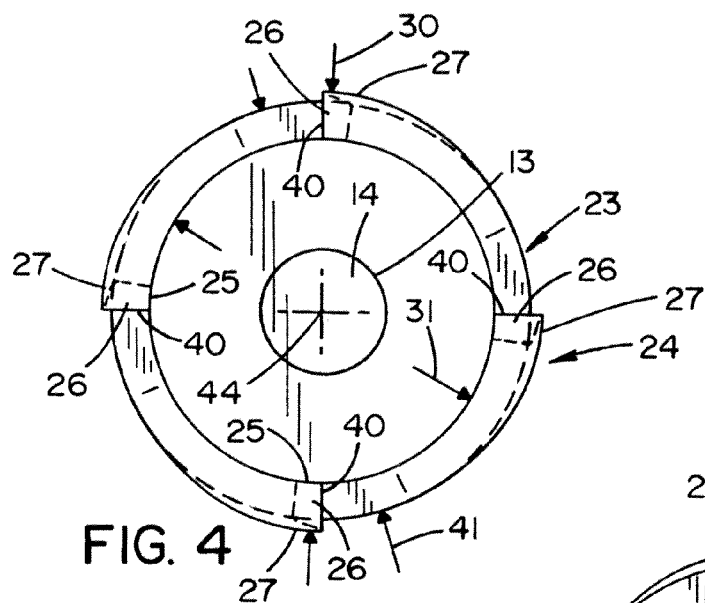
FIG. 4 is a bottom view of the garden auger in accordance with the present disclosure.
Figure 5:
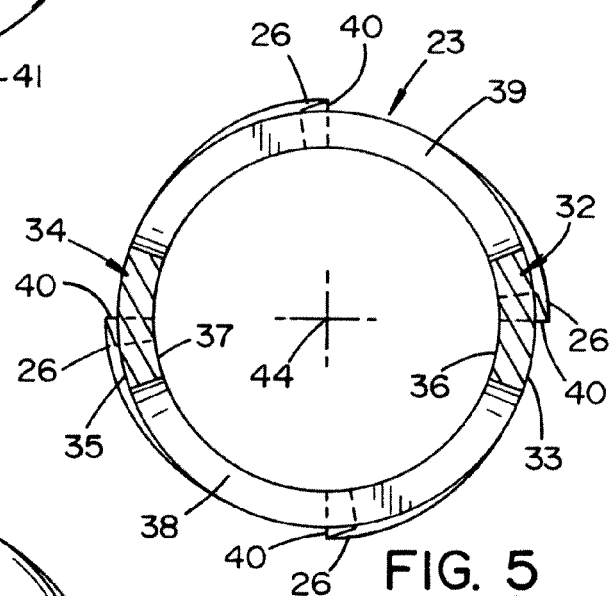
FIG. 5 is a cross sectional view taken along line 5-5 of FIG. 3.
Figure 6:
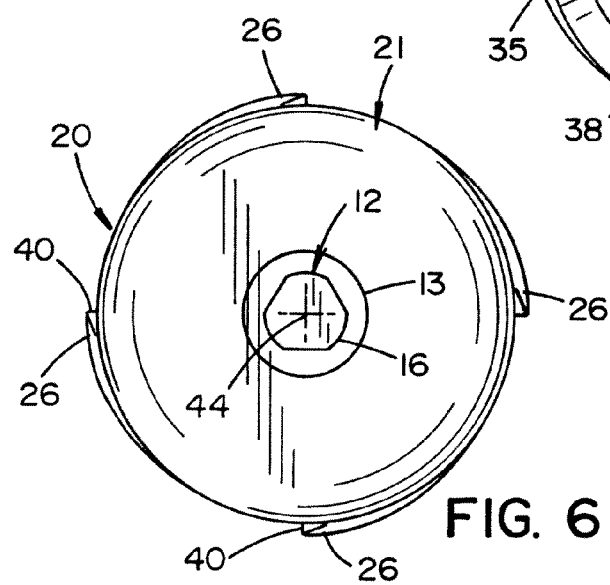
FIG. 6 is a top view of the garden auger in accordance with the present disclosure.

The auger body 20 of the garden auger 10 of FIG. 1 and FIG. 2 includes a bottom radial side or leading end 23. The bottom side 23 and top side 21 can be connected by at least two legs 32, 34. The leading end 23 further includes a cutter 24 extending outward from the bottom side 23 in the form of a ring. The cutter 24 includes a plurality of teeth 26 having a cutting length L between 0.25 and 0.75 inches. Each tooth can have a rake angle 28 from about 15 degrees to about 25 degrees, and a bevel angle 29 from about 15 degrees to about 25 degrees. In one exemplary embodiment, the auger 10 includes four teeth 26. It is to be appreciated that a cutting diameter 30, formed by outer edges 27 of the teeth 26, is greater than an outside diameter 41 formed by legs 32, 34 of the auger body 20. The cutting diameter 30 is generally equal to the diameter of the hole that is to be created. In one exemplary arrangement, the cutting diameter 30 is about 2 inches and the outside diameter 41 is slightly less than 2 inches. It is to be appreciated that inner edges 25 of teeth 26 define an inside diameter 31. Inside diameter 31 is less than outside diameter 41 (FIG. 4). In this manner, the teeth 26 forming the cutting diameter 30 cut the exterior wall of the hole while the legs 32, 34, defining the inside diameter 31 and the outside diameter 41, turn through dirt and mulch that has already been churned by the cutter 24. It is to be appreciated that more or less teeth, relative to what is shown in the Figures, can be integrally formed with the cutter 24.

The auger body 20 can be made from a single piece of material, for example aluminum or steel. The length of the auger body 20 is approximately equal to the depth D of the hole that is to be created. In one exemplary embodiment, the outside diameter 41 of the body 20 is from about 1 inch to about 3 inches, and the length of the body is from about 3 inches to about 6 inches. In the exemplary embodiment, the legs 32, 34 of the body 20 are ⅛" thick. In the exemplary embodiment of FIG. 1, the auger body 20 was constructed from metal, specifically aluminum and the shaft 12 was constructed from steel. It is to be appreciated that the entire garden auger 10 can be of a single piece construction and molded using a high strength non-brittle plastic material.

In one embodiment, the cutter 24 includes four teeth 26 having tips 40 spaced generally 90 degrees from one another around the circumference of bottom side 23. The tips 40 define a cutting plane 48 generally normal to the axis of rotation. The teeth 26 can extend generally parallel to and can be equi-spaced around the axis of rotation 44. The teeth 26 can be oriented or offset at an angle from about 20 degrees to about 40 degrees outward from the bottom side 23.

The garden auger 10 depicted in FIGS. 1-6 has proven highly effective in high loam soil and in high clay content soil. Once the auger 10 is removed from the hole formed in the ground, a significant portion of the cut and turned soil, in the form of a plug, can be removed along with the auger 10 as the auger 10 is extracted from the hole. The auger 10 can then be tilted to allow the soil to fall out of the auger body 20 adjacent the hole. In a high clay content soil or high water content soil, the operator can push his/her hand through the openings 38, 39 between the legs 32, 34 to push the soil out of the auger body 20. If the plug is not removed from the hole along with the extraction of the auger 10, the plug can be removed manually after the auger 10 is extracted from the hole.

As described above, the auger body 20 includes legs 32, 34 which connect the top side 21 to the bottom side 23. Each leg 32, 34 generally have a curvilinear outside face 33, 35, and a generally curvilinear inner face 36, 37, respectively. Each leg 32 and 34 can have a generally rectangular cross section and be spaced approximately 180 degrees from one another. The inside or inner diameter 31 formed between legs 32, 34, and defined by inner faces 36, 37 (and inner edges 25), is less than the outside or outer diameter 41 and the cutting diameter 30 defined by outside faces 33, 35 and by outer edges 27 of cutting teeth 26, respectively. As shown in the FIGURES, the cutting teeth 26 are offset to the outside.

In practice, an efficient method for planting perennial starts, bulbs, seedlings or cuttings in small patches by a single person is to insert the garden auger 10 having the shaft 12 and a cutting diameter 30 substantially equal to the diameter of the hole to be created in a drill motor (not shown); rotating the garden auger 10 at a very high rate of rotation, preferably approximately the highest RPM of conventional ⅜" drill motors; kneeling or bending to create the holes for planting by penetrating the ground until the top side 21 of the auger body 20 is at or slightly below ground level and, while still kneeling or bending, pulling the garden auger 10 (and soil 'plug') from the hole, dropping the soil 'plug' from the auger body 20 adjacent the hole, and inserting the bulbs in the created holes and, while still kneeling or bending, finishing the area over and around the bulbs by pushing the soil adjacent the hole into the hole thereby covering the now planted bulb.

In practice, an efficient method for planting perennial starts, bulbs, seedlings or cuttings over a wide area can be conducted by using a shaft with a length of greater than two feet (not shown) and an auger body 20 having a cutting diameter approximately equal to the diameter of the desired hole in a drill motor, rotating the garden auger 10 at a very high rate of rotation, preferably approximately the highest RPM of conventional ⅜" drill motors, creating the holes for planting without bending or kneeling by penetrating the ground until the top of the auger body 20 is at or slightly below ground level, pulling the garden auger 10 (and soil 'plug') from the hole, dropping the soil 'plug' from the auger body 20 adjacent the hole, inserting the bulbs (or other plant) into the holes and finishing the area over and around the bulbs by pushing the soil adjacent the hole into the hole thereby covering the now planted bulb.

In use, the cutter 24 and teeth 26 are effective to clear the ground of vegetation, termed scalping, at the initiation of drilling the hole. The teeth 26, when driven by a drill motor, gently draw the garden auger 10 into the ground. The cutter 24 breaks up clumps of earthen material to comminute the soil dislodged by the teeth 26. The finely cultivated soil, along with a portion of soil placed above the bulb, provide an optimum environment for starting the growth of a tulip, or similar.

Root cutting during hole preparation is especially beneficial since roots cause standard augers to frequently catch, which is a nuisance. Automatic root cutting avoids the frustration of having the auger grab. The cutter 24 is designed to automatically cut the roots as it penetrates the earth and allows the garden auger 10 to easily bore uniform holes and minimizes the number of times the hole sides collapse or the number of times the auger 'catches' on roots/vegetation.

The dirt extraction, i.e. plug removal, feature pulverizes the dirt and then enables plug extraction when the garden auger 10 is pulled from the hole which allows placement of the dirt around the debris-cleared perimeter of the hole. The dirt can then be easily and quickly refilled over the bulb or around the plant with little or no surface debris mixed in with it. Pulverizing the dirt improves water absorption, helps to eliminate air pocket voids in the dirt and provides soft dirt where the roots will take hold. Having pulverized dirt also makes it easier for the gardener to refill the hole over the bulb or around the new plant since the smaller particles sift in more easily. Piling the dirt near to and around the perimeter of the hole, in a controlled way, makes it easy to simply refill the hole and then replace or return the mulch.

Accurate depth control with good hole formation, applied to perennials, allows easy, consistent, one-step bulb planting at the optimum depth. The accurate-depth planting also allows perennials, such as tulips, to be planted at their normal deeper depth, and then annuals can be planted adjacent to or over them. This dual use of the flowerbed offers a longer flowering season without the work of removing all the bulbs. With depth accuracy, the deeper bulbs are not accidentally damaged or disturbed if they are left in the ground, when shallow annuals are planted above or near them. Attention must be given to the types of plants selected, of course, since some perennials need to be planted at less than 3". There is however a huge assortment that can go in at 4" or more.

Centering the auger is accomplished with the radial cutter 24 acting as a leading edge so that it is easy to locate the planting hole. It is simply worked past any debris and lightly stuck into the ground about ¼". The drill motor is positioned vertically, started at a moderate speed, and then light downward pressure is applied to start the drilling operation. It is to be appreciated that tips 40 are the leading extensions of teeth 26 and provide a slight pulling of the cutter 24 into the hole as the auger 10 contacts the ground.

While the disclosure has been described with regard to presently known and various embodiments, it is to be understood that the disclosure is not to be limited to those disclosed embodiments and not restricted except within the scope and spirit of the claims appended hereto.

I claim:

1. A garden auger comprising:
   a shank and an auger body;
   said auger body comprising a leading end and a trailing end including a space therebetween;
   said auger body being substantially radial including at least two legs connecting said trailing end and said leading end;
   said leading end having a cutter including a plurality of teeth forming a cutting diameter;
   said plurality of teeth each having a tip extending from said leading end, wherein said tips form a plane;
   said plane is substantially perpendicular to an axis of rotation of said garden auger;
   said auger body attached to said shank to prevent rotation therebetween;
   said shank comprising an attachment portion for attachment to a drill motor;

said plurality of teeth and said tips are equi-spaced about said leading end including equal gaps between each tooth; and, said each tooth includes a rake angle from about 15 degrees to about 25 degrees and a bevel angle from about 15 degrees to about 25 degrees.

2. The garden auger of claim 1 wherein said attachment portion is adapted to be inserted in a drill chuck and driven by the drill motor.

3. The garden auger of claim 1, wherein said first and second legs include curvilinear inner sides and curvilinear outer sides.

4. The garden auger of claim 3, wherein said trailing end includes a substantially planar inner side.

5. The garden auger of claim 1, wherein said shank further includes a hexagonal cross section including three flat sides alternating with three curvilinear sides.

6. The garden auger of claim 1, wherein said first and second legs form an outside diameter therebetween substantially equal to a diameter of said trailing end and less than said cutting diameter.

7. The garden auger of claim 1, wherein said equi-spaced teeth, said tips, said gaps, and said rake angles, along with said bevel angle draws said auger into the ground during rotation of said auger.

8. The garden auger of claim 7, wherein said teeth automatically cut roots while said auger is rotating and penetrating the ground.

9. A garden auger for forming a planting hole in soil, comprising:
a shank and an auger body;
said auger body comprising a leading end, a trailing end, and at least one leg connecting said leading end and said trailing end;
said garden auger further includes an axis of rotation centered within said auger body, said leading end, and said trailing end;
said leading end including a rotary cutter having a plurality of teeth for cutting the planting hole in soil;
said rotary cutter having a cutting diameter and said auger body having an outside diameter;
said cutting diameter larger than said outside diameter;
said leading end, said trailing end, and said at least one leg forming a housing for holding a plug of soil upon extraction of said garden auger from a formed planting hole;
said plurality of teeth each having a tip extending from said leading end, wherein said tips form a plane;
said plurality of teeth including said tips are equi-spaced about said leading end including equal gaps spaced generally 90 degrees from one another around a perimeter of said leading end; and,
each said tooth includes a rack angle from about 15 degrees to about 25 degrees and a bevel angle from about 15 degrees to about 25 degrees.

10. The garden auger of claim 9, wherein said auger body is attached to said shank to prevent rotation therebetween;
said shank comprising an attachment portion; and
said attachment portion is adapted to be inserted in a drill chuck and driven by a drill motor.

11. The garden auger of claim 10, wherein said trailing end includes a substantially planar inner side.

12. The garden auger of claim 9, wherein said outside diameter substantially equal to a diameter of said trailing end and greater than an inside diameter of said auger body.

13. The garden auger of claim 9, wherein said plug of soil passes out through an area between said leading end, said trailing end, and said at least one leg upon extraction of said garden auger from the formed planting hole.

14. The garden auger of claim 9, wherein said equi-spaced teeth, said tips, said gaps, and said rake angles, along with said bevel angle draws said auger into the ground during rotation of said auger.

15. The garden auger of claim 14, wherein said teeth automatically cut roots while said auger is rotating and penetrating the ground.

16. A method for forming a planting hole in soil using a portable drill having a chuck for receiving tools to be rotatably driven, the method comprising:
engaging soil with a leading end of an auger body wherein said leading end having a circular perimeter including a plurality of cutting teeth therearound, said cutting teeth being equi-spaced around a perimeter of said leading end;
rotating a trailing end of said auger body, via rotation of a shank adapted for insertion into the chuck of the drill, in a direction to advance said cutting teeth into said soil to form a plug of said soil for extraction of said plug from said planting hole;
removing said auger body from said planting hole while maintaining rotation of said auger body, thereby extracting said plug including a substantial portion of said soil within the planting hole;
wherein said substantial portion of said soil includes at least a majority of said soil within the planting hole;
each tooth of said plurality of teeth includes a tip extending from said leading end;
each said tooth includes a rake angle from about 15 degrees to about 25 degrees and a bevel angle from about 15 degrees to about 25 degrees; and,
said tips are equi-spaced about said leading end including equi-spaced gaps therebetween for drawing said auger into said soil upon rotation of said auger body and automatically cutting roots as said auger penetrates into said soil.

17. A method for forming a planting hole in soil as claimed in claim 16, further comprising:
advancing said auger body into said soil to a desired planting hole depth; and
wherein said planting hole depth is substantially set by a height of said auger body.

18. A method for forming a planting hole in soil as claimed in claim 17, further comprising:
maintaining the same said direction of rotation of said auger body while removing said plug from said planting hole.

* * * * *